Sept. 20, 1932.  R. C. GALLINANT  1,878,769
STEERING WHEEL SWITCH CLIP
Filed Feb. 8, 1932
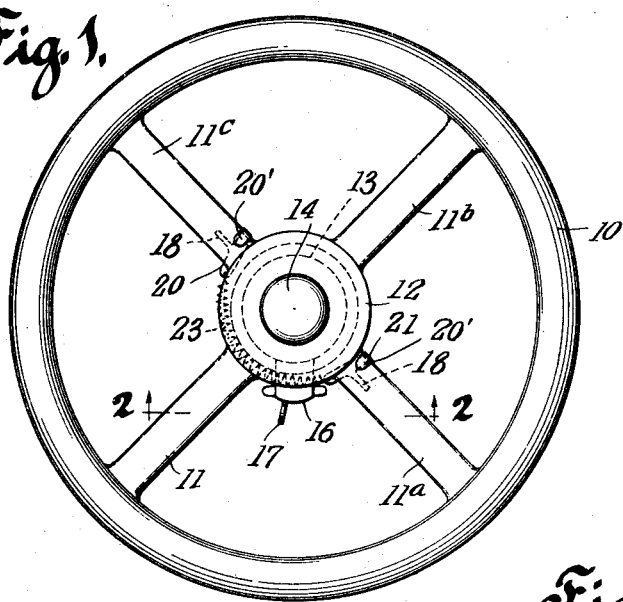
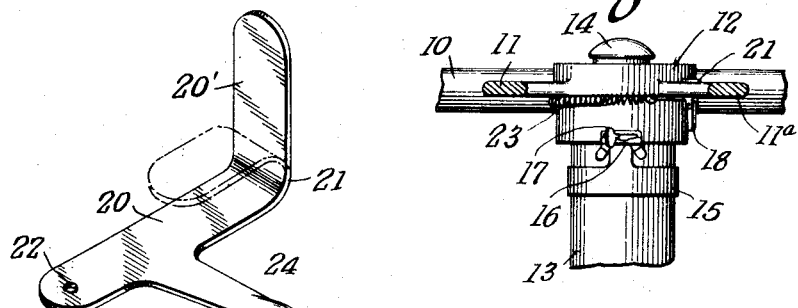
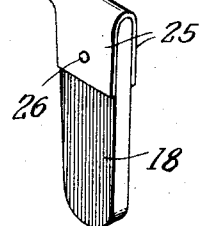
Raphael C. Gallinant
INVENTOR
BY
Warren E. Willis
ATTORNEY Patented Sept. 20, 1932

1,878,769

UNITED STATES PATENT OFFICE

RAPHAEL C. GALLINANT, OF RIDGEFIELD PARK, NEW JERSEY

STEERING WHEEL SWITCH CLIP

Application filed February 8, 1932. Serial No. 592,148.

This invention relates to improvements in means for attaching clips to supports, with special reference to the spokes of wheels, as for instance the steering wheel of a dirigible automotive vehicle, the invention directly relating to vehicles where a direction signal is used, including a switch closed by a slidable element movable into operative position by manual contact and opened automatically by a yieldable element carried by the steering wheel, when a proposed turn of the car shall have been made.

As different makes of vehicles are furnished with steering wheels varying in number and position of spokes and the spokes being also variable in size, shape and material, no single form of clip will suit all vehicles alike.

Moreover any type of clamp is objectionable in appearance and mars the spoke to which it is attached, while to fasten the device by screws to the spoke is even more objectionable, as it disfigures the wheel and requires the services of a mechanic in drilling and tapping.

It is therefore the main object of the present invention to provide a form of clip adapted to engage on the edges of substantially all forms of wheel spokes without damage or defacement.

A further feature is in the provision of means for drawing a pair of such clips forcefully but resiliently into operative position relative to the wheel spokes on which they are positioned.

Another aim is to incorporate with one or both of the clips arms provided with sockets in which a yieldable contact finger is secured.

These several objects are attained by the novel construction and arrangement of parts hereinafter described and shown in the annexed drawing, forming a material part thereof, and in which:—

Figure 1 is a plan view of a conventional steering wheel showing an application of the invention.

Figure 2 is a partial side, partial sectional view taken on a plane represented by the line 2—2 of Fig. 1.

Figure 3 is a perspective view of the clip in detail.

The hand wheel illustrated consists of a rim 10 connected by spokes 11—11a—11b—11c to a hub 12 fixed on the upper end of a steering post 13, all these several parts being of common, well known construction, as is the audible signal or horn indicated by the button 14.

In order to indicate the purpose of the invention, a band 15 is shown as fixed on the post 13 supporting a visual signal switch, generally designated at 16 and including a reciprocatively movable pad 17 that, in either of its extreme positions, closes the switch to cause right or left hand signals respectively to be given, at which times the pad is raised relative to the plane it assumes when in a central, neutral position and the switch open.

This pad 17, which is essentially the lever of a two-way switch, is manipulated into either of its closing positions selectively by means not shown as they are not part of the present invention, which is concerned with means for displacing the pad from its operative positions to neutral, in either direction, involuntarily upon turning the steering wheel to direct the car from a curved to its normal straight course.

To accomplish displacement of the pad 17 a flexible finger 18 is carried by the wheel in such position as to make contact with the pad, when in either of its raised positions, as the wheel is rotated.

The present invention relates primarily to the clip carrying the finger and consists of a strap-like sheet metal body 20, preferably parallel in width and having rounded ends, one portion 20′ being bent upright to eventually form a loop 21 adapted to closely encircle one of the edges of a wheel spoke, as 11a.

In the opposite end of the clip body is an opening 22 in which is engaged the end of a helically coiled tension spring 23 connecting with a duplicate but reversed clip.

An arm 24 extends outwardly from the edge of the clip to any required distance, the outer end of the arm being formed into a forked socket 25 into which is set the finger 18, held therein by indenting the material, as at 26.

The steering wheel may have any number of spokes and the cross-section and size of these spokes may vary in one wheel from another, the only difference being a slight change at the bend 21.

Obviously the spring 23 holds the clips in firm engagement, the spring and greater part of the clips being concealed by the upper portion of the wheel hub against which the spring is seated. The inner edges of the clips are drawn tangent to the hub, but not at right angles, as best seen in Fig. 1, while the arms 18 extend radially outward between the spokes, which show nothing but the small loops 21 at their edges.

The arms 24 admit of bending up or down to such an extent as may be required to bring the fingers 18 into proper operative position to engage the pad, as the wheel is rotated, and the fingers pass over the pad without touching when the latter is in its neutral position.

As the fingers are yieldable in either direction, being made of rubber, soft leather or other pliable resilient material, it is preferable that one be carried in each clip, so as to be relatively close to the pad immediately upon the initial turning of the wheel when directing the course of the car in a straight path.

From the foregoing it will be seen that a simple device for this purpose has been disclosed in the preferred form of its embodiment, but it is not desired to restrict the details to the exact construction shown, it being obvious that changes, not involving the exercise of invention, may be made without conflicting with the scope of the appended claims.

Having thus described the invention, what is claimed as new and desired to secure by Letters Patent, is:—

1. A pair of opposed switch actuating clips having hooks at their outer ends to engage spaced supports, and a resilient connection between said clips to tensionally retain them on the supports.

2. The combination with a spoked wheel having a hub, of a pair of electric switch operating clips selectively engageable with the spokes, and elastic connections between said clips to draw them into contact with the spokes.

3. The combination with a wheel having a hub and radial spokes, of one or more switch controlling clips to engage the spokes selectively, and resilient means connecting said clips to urge them against the spokes, said means partially encircling said hub.

4. The combination with the steering wheel of a dirigible vehicle, of a pair of opposed clips having means to engage the edges of the wheel spokes selectively, tensional means to draw the clips into positive engagement with the spokes, arms extending radially outward from said clips, and a resilient finger on the outer end of on or both of said arms adapted to actuate a switch.

5. The combination with the steering wheel of a dirigible vehicle and a switch having two closed and one intermediate open position controlled by a pad, of a pair of clips fitting the spokes of said wheel, resilient means to retain the clips in engagement on selected spokes, and a yieldable finger carried by one or both of said clips to displace said pad from closed to open position in either direction upon turning said wheel.

6. The combination with a steering post, steering wheel and a switch mounted on said post, of a pair of clips adjustably mounted on the spokes of said wheel having constraining means extending therebetween, and a yieldable finger carried by one or both of said clips, said finger being freely movable over said switch repeatedly when the wheel is turned in one direction and to actuate the switch when the wheel is turned in an opposite direction.

In testimony whereof I affix my signature.

RAPHAEL C. GALLINANT.